United States Patent Office 2,794,833
Patented June 4, 1957

2,794,833
2-AMINO-5-NITROBENZENE-1-SULFONIC ACID FLUORIDE AND DERIVATIVES THEREOF

Ernst Merian, Allschwil, near Basel, Switzerland, assignor, by mesne assignments, to Saul & Co., Newark, N. J., as nominee of Fidelity Union Trust Company No Drawing. Application December 21, 1953, Serial No. 399,609

Claims priority, application Switzerland December 24, 1952

7 Claims. (Cl. 260—543)

The present invention relates to new valuable intermediates being useful in most instances as diazo components for the production of azo dyes.

The compounds of the present invention correspond to the formula

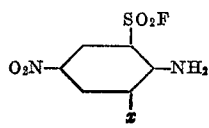

wherein $x$ stands for hydrogen, halogen, nitro, lower alkyl, lower alkoxy or trifluoromethyl.

The new 2-amino-5-nitrobenzene-1-sulfonic acid fluorides can be prepared by treating the corresponding 2-amino-5-nitrobenzene-1-sulfonic acid chlorides with salts of hydrofluoric acid and, when $x$ stands for hydrogen, treating, if desired, the thus obtained 2-amino-5-nitrobenzene-1-sulfonic acid fluoride with a halogenating agent.

It is surprising and could not at all be foreseen that 2-amino-5-nitrobenzene-1-sulfonic acid chlorides containing a free amino group would react with salts of hydrofluoric acid to yield the corresponding sulfonic acid fluorides without attacking the free amino group. The treatment is advantageously carried out at elevated temperatures, f. i. at 100° C., and in the presence of water as reaction medium. As salts of hydrofluoric acid there are preferably employed the inorganic ones, such as the alkalimetal fluorides, their acid salts or their complex compounds.

The 2-amino-5-nitrobenzene-1-sulfonic acid chlorides that are used for the preparation of the compounds of my invention are made in known manner by treating the corresponding 2-amino-5-nitrobenzene-1-sulfonic acids or their salts respectively, for instance with phosphorus oxychloride according to the conditions described in the Swiss Patent No. 162,735 and in the German Patent No. 676,785. The 2-amino-3-methyl-5-nitrobenzene-1-sulfonic acid which is new may be obtained by treating 2-amino-3-methyl-5-nitrobenzene at 120° C. in tetrachloroethane with chlorosulfonic acid. The 2-amino-3-trifluoromethyl-5-nitrobenzene-1-sulfonic acid which is also new, can be prepared by reacting 2-chloro-3-trifluoromethyl-5-nitrobenzene at 60° C. with a mixture of sulfuric acid and sulfur trioxide and treating the resultant 2-chloro-3-trifluoromethyl-5-nitrozenzene-1-sulfonic acid at about 130° and under pressure with ammonia.

The following examples illustrate the invention without, however, being restrictive thereof. In the said examples, the parts and percentages are by weight, and the temperatures are in degrees centigrade.

Example 1

A paste consisting of 372 parts of 2-amino-5-nitrobenzene-1-sulfonic acid chloride and of 400 parts of water is stirred up together with 100 parts of sodium fluoride. The reaction mixture is then heated to the boil, when a fine, slightly yellowish dispersion is formed. After the reaction is complete, the mass is diluted with water, filtered and washed free from chlorine ions, which may be controlled by addition of a silver nitrate solution to the wash water. After drying, the resultant powder melts at 160–162°. By recrystallisation from ethanol, the 2-amino-5-nitrobenzene-1-sulfonic acid fluoride is obtained in the form of longish tinsels having a melting point of 163°.

In quite a similar way the following 2-amino-5-nitrobenzene-1-sulfonic acid fluorides are prepared from the corresponding sulfonic acid chlorides as starting compounds: 2-amino-3-fluoro-5-nitrobenzene-1-sulfonic acid fluoride, 2-amino-3-bromo-5-nitrobenzene-1-sulfonic acid fluoride, 2-amino-3-ethyl-5-nitrobenzene-1-sulfonic acid fluoride and 2-amino-3-ethoxy-5-nitrobenzene-1-sulfonic acid fluoride.

The following table contains further 2-amino-5-nitrobenzene-1-sulfonic acid fluorides which may be made according to the process described in Example 1:

| Example No. | Substituent in position 3 of the benzene nucleus | Melting point, degrees |
|---|---|---|
| 2 | —Cl | 132 |
| 3 | —CH₃ | 268 |
| 4 | —CF₃ | 301 |
| 5 | —OCH₃ | 167 |
| 6 | —NO₂ | >290 |

In a similar way as set forth in Example 1 also lithium fluoride and potassium fluoride are—instead of sodium fluoride—suitable for the preparation of the new sulfonic acid fluorides.

Example 7

55 parts of 2-amino-5-nitrobenzene-1-sulfonic acid fluoride (obtained according to the data given in Example 1) and 350 parts of 30% hydrochloric acid are well stirred. At a temperature of 0–5° a solution of 11 parts of sodium chlorate in 20 parts of water is then added dropwise to the yellowish suspension. Some time afterwards the reaction mass is diluted with water and the precipitated 2-amino-3-chloro-5-nitrobenzene-1-sulfonic acid fluoride is isolated by filtration, is washed free from acid and is dried. It has a raw melting point of 126–128°. By recrystallisation from ethanol yellowish leaves are obtained which melt at 132°.

*Analysis.*—Nitrogen: Calcd., 11.00%; found, 11.12%. Sulfur: Calcd., 12.58%; found, 12.46%.

The product is identical with that of Example 2.

Having thus disclosed the invention, what is claimed is:

1. 2-amino-5-nitrobenzene-1-sulfonic acid fluoride.

2. A process for the preparation of a 2-amino-5-nitrobenzene-1-sulfonic acid fluoride which comprises the step of treating, at elevated temperature up to 100° C. and in an aqueous medium, a 2-amino-5-nitrobenzene-1-sulfonic acid chloride which corresponds to the formula

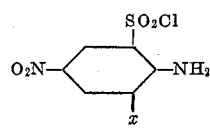

wherein $x$ stands for a member selected from the group consisting of hydrogen, halogen, nitro, lower alkyl, lower alkoxy and trifluoromethyl, with an alkali metal salt of hydrofluoric acid.

3. The process for the preparation of 2-amino-5-nitrobenzene-1-sulfonic acid fluoride which comprises the step of treating, at elevated temperature and in an aqueous medium, 2-amino-5-nitrobenzene-1-sulfonic acid chloride with sodium fluoride.

4. The process for the preparation of 2-amino-3-chloro-5-nitrobenzene-1-sulfonic acid fluoride which comprises the step of treating, at elevated temperature and in an aqueous medium, 2-amino-3-chloro-5-nitrobenzene-1-sulfonic acid chloride with sodium fluoride.

5. The process for the preparation of 2-amino-3-bromo-5-nitrobenzene-1-sulfonic acid fluoride which comprises the step of treating, at elevated temperature and in an aqueous medium, 2-amino-3-bromo-5-nitrobenzene-1-sulfonic acid chloride with sodium fluoride.

6. The process for the preparation of 2-amino-3-trifluoromethyl-5-nitrobenzene-1-sulfonic acid fluoride which comprises the step of treating, at elevated temperature and in an aqueous medium, 2-amino-3-trifluoromethyl-5-nitrobenzene-1-sulfonic acid chloride with sodium fluoride.

7. The process for the preparation of 2-amino-3-methoxy-5-nitrobenzene-1-sulfonic acid fluoride which comprises the step of treating, at elevated temperature and in an aqueous medium, 2-amino-3-methoxy-5-nitrobenzene-1-sulfonic acid chloride with sodium fluoride.

References Cited in the file of this patent

UNITED STATES PATENTS

| | | |
|---|---|---|
| 2,437,644 | Lecher et al. | Mar. 9, 1948 |

FOREIGN PATENTS

| | | |
|---|---|---|
| 676,785 | Germany | June 12, 1939 |